Feb. 20, 1968 J. H. ADAMS ET AL 3,369,842
ADAPTER DEVICE FOR RELEASABLE ATTACHMENT OF A
SHOULDER STRAP TO A LAP-TYPE SAFETY BELT
Filed Jan. 17, 1967 2 Sheets-Sheet 1

INVENTORS.
LOUIS ROMANZI, JR.
JOHN H. ADAMS

By
Miketta, Glenny, Pome & Smith
ATTORNEYS.

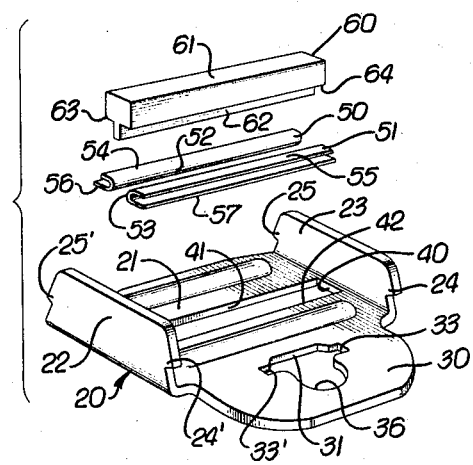

United States Patent Office 3,369,842
Patented Feb. 20, 1968

3,369,842
ADAPTER DEVICE FOR RELEASABLE ATTACHMENT OF A SHOULDER STRAP TO A LAP-TYPE SAFETY BELT
John H. Adams, Rochester, and Louis Romanzi, Jr., Le Roy, N.Y., assignors to American Safety Equipment Corporation, New York, N.Y., a corporation of New York
Filed Jan. 17, 1967, Ser. No. 609,811
14 Claims. (Cl. 297—389)

ABSTRACT OF THE DISCLOSURE

An adapter device to be immovably assembed to a lap-type safely belt strap for releasably attaching a shoulder harness strap to the lap belt to provide a combination shoulder harness and lap belt safely restraint apparatus for passengers in moving vehicles.

Background of the invention

Safely belts have become standard equipment on most new automotive equipment and aircraft. As users, particularly automotive, become more accustomed to and appreciate the value of safely restraint apparatus, it is expected that combination shoulder harness and lap belt safety restraint devices will become more universally used. Such combination shoulder harness and lap belt safety restraint devices have heretofore only been offered as pre-assembled units which can be installed as original equipment or installed in place of existing safety belt installations. It is the primary object of the present invention to disclose and provide an adapter device for easily and effectively converting pre-existing conventional lap-type safety belts into combination shoulder harness and lap belt safety restraint devices through the addition of the adapter device and a single shoulder strap and associated end fitting.

It is another object of the present invention to disclose and provide an adapter device for use in combination shoulder harness and lap belt safety restraint apparatus to releasably connect a shoulder strap to a lap belt strap section wherein the adapter device is provided with connector means for receiving and releasably retaining an end fitting of the associated shoulder strap of the restraint apparatus and wherein the adapter device is easily and thereafter immovably assembled to the lap belt strap section without need for removing buckle or end fitting means associated with said strap section.

It is a further object of the present invention to disclose and provide an adapter device as in the foregoing object wherein the adapter may be immovably mounted upon the associated lap belt strap section by insertion of a strap loop into a portion of the adapter with means within the adapter for fixedly restraining said loop within the adapter to thereby immovably mount the adapter on the belt strap section.

It is a still further object of the present invention to disclose and provide an adapter device as in the foregoing objects wherein a strap loop of the associated lap belt received within the adapter body is held therein by a load bar means loosely disposed between side walls of the adapter device within the strap loop received therein, the load bar means cooperating with the adapter device base and the surrounding strap loop to immovably mount the adapter device on said belt strap section.

It is also an object of the present invention to disclose and provide an adapter means as in the foregoing objects wherein the load bar means includes bar portions disposed within the strap loop received within the adapter device which extend down between opposed side faces of an aperture in the adapter device base for positioning the load bar freely disposed within the adapter device as well as for snubbing portions of the strap loop received therein.

It is also an object of the present invention to disclose and provide an adapter device as in any of the foregoing objects wherein the adapter device is provided with a plate-like extension of a base portion thereof with aperture means therein to releasably receive and retain an end fitting of a shoulder strap to be assembled to the lap belt.

It is another object of the present invention to disclose and provide cover means associated with the base of the adapter device of any of the foregoing objects which cooperates with the enclosed and internally retained strap loop and load bar means for limiting vertical movement of the load bar means and associated strap loop relative to the base aperture to prevent loosening of the adapter device on the associated lap belt strap section when the lap belt is not in use under load.

It is another object of the present invention to disclose and provide an adapter device as in the foregoing objects wherein an aperture in the adapter device base for receiving a strap section loop therethrough is provided with additional web means for providing rounded surfaces at the aperture opposed side faces to prevent undue wearing and fraying of the strap section passed through such aperture during continuous use.

Summary of the invention

The present invention includes the provision of an adapter device having a base and a pair of side walls on a pre-existing and assembled lap belt strap to convert a simple lap-type safety belt into a combination shoulder harness and lap belt restraint device. The adapter is immovably mounted to the lap belt strap by introducing a portion or loop of the lap belt strap into the adapter through an aperture in its base and between the side walls thereof and constraining it therein by a novel load bar means loosely disposed within the adapter. The load bar is positioned within the strap loop with a depending portion snubbing portions of the strap loop against upper marginal portions of the aperture in the adapter base. The adapter is thereby immovably mounted in a fixed position on the lap belt strap, preferably closely spaced thereon from the associated buckle, to releasably receive and restrain a cooperating end fitting provided on the lower end of the added shoulder strap.

These and various other objects and advantages of the adapter device according to the present invention will become apparent to those skilled in the art from a consideration of the following detailed description of exemplary embodiments thereof. Reference will be made to the appended sheets of drawings in which:

FIG. 1 is a front elevational view of a combination shoulder harness and lap belt safety restraint apparatus including an exemplary embodiment of the adapter device according to the present invention;

FIG. 2 is an enlarged plan view of the exemplary embodiment of adapter device of FIG. 1 with the cover plate partially removed;

FIG. 3 is a sectional view of the exemplary embodiment of adapter device of FIG. 2 taken therein along the plane 3—3;

FIG. 4 is an exploded view of portions of the exemplary embodiment of adapter device of FIGS. 1 through 3;

FIG. 5 is a plan view of an alternative exemplary embodiment of adapter device according to the present invention;

FIG. 6 is a sectional view of the alternative exemplary embodiment of FIG. 5 taken therein along the plane 6—6; and FIG. 7 is a perspective view of the load bar of the alternative exemplary embodiment of FIG. 6.

Referring first to FIGS. 1 through 4, a detailed explanation of a preferred exemplary embodiment of the adapter device, according to the present invention, will now be made. As seen in FIG. 1, the adapter device according to the present invention is intended to be used in a combination shoulder harness and lap belt safety restraint apparatus, sometimes referred to as a three point anchorage system.

The preferred exemplary embodiment of adapter device, according to the present invention, is indicated generally in FIG. 1 at 10 mounted upon the buckle mounting strap section of any conventional lap safety belt restraint apparatus. In the exemplary embodiment of FIG. 1, lap belt strap section 11 mounts a buckle means 12 at one end to releasably lock onto a cooperating floor anchorage 13. Buckle 12 may include movable hook means for locking onto eye means provided at the top of the floor anchorage 13 in known manner. The opposite end of the buckle strap section 11 in the exemplary embodiment is fastened within a retraction mechanism 14 which in turn is pivotally mounted at 15 to a floor fitting. Retraction mechanism 14 is adapted to retract the belt section 11 when not in use and to hold it in locked extended position when in use in a manner known in the art. It should be understood that any conventional safety belt apparatus can be employed, including the commonly used metal-to-metal safety belt devices where a tongue plate is mounted on one strap section to be lockingly engaged by a push button or pivoted handle operated buckle means mounted to a second strap or buckle strap section, the two strap sections being anchored on opposite sides of the user's chair to floor fittings in conventional manner. In any event, the adapter device, indicated generally at 10, according to the present invention is to be immovably installed or assembled to a strap section of the safety belt apparatus to place it off center from the user to lockingly receive a shoulder strap oriented diagonally across the user's chest and one shoulder as seen in FIG. 1.

In most conventional safety belt installations in automobiles and airplanes at present, a conventional lap-type safety belt will be found in use. Shoulder straps are becoming more commonly employed in pre-assembled shoulder harness and lap belt safety restraint devices, but have heretofore not been easily added to pre-existing or installed conventional lap-type safety belts. According to the present invention, the exemplary embodiment of adapter device, as seen in FIG. 1, may be immovably mounted or assembled to the pre-installed and assembled lap belt strap section 11 to receive an added shoulder harness or strap 16 whose upper end is securely fastened to a fitting 17 secured to the vehicle frame or other suitable support. A conventional strap length adjustment means 18 may be provided for adjusting the length of the shoulder harness strap 16 in known manner. The adapter device, indicated generally at 10, according to the present invention, is intended to releasably receive and secure the end fitting of the shoulder harness strap to the pre-assembled or installed lap belt section 11 with the shoulder strap 16 passing diagonally over the user's chest and shoulder opposite to his side that the adapter is adjacent to, as seen in FIG. 1.

Referring now particularly to FIGS. 2, 3 and 4, it may be seen that the preferred exemplary embodiment of adapter device, according to the present invention, includes a body 20 having a base 21 and a pair of spaced upstanding side walls 22 and 23. Side walls 22 and 23 may be formed integrally with base 21, the adapter body being stamped and formed out of a single piece of metal. As best seen in FIG. 3, each of the side walls 22 and 23 includes forwardly and rearwardly extending projections 24, 24' and 25, 25' over which a cover plate 26 is adapted to snap and be securely assembled thereto by the cover inturned flanges 27 and 28.

Connector means are associated with the adapter base for receiving and releasably retaining an end fitting of the associated shoulder strap 16 of the exemplary restraint apparatus. As best seen in FIGS. 2 and 3, the adapter base 21 is provided with a plate-like extension 30 extending longitudinally outward of the base side walls 22 and 23. Extension 30 in the exemplary embodiment is provided with an aperture 31 therethrough for receiving and locking the end fitting 32 thereto. As best seen in FIG. 4, aperture 31 is provided with slot-like extensions 33 and 33' to allow a winged head 34 of the end fitting 32 to be passed down through aperture 31, head 34 underlying plate-like extension 30 when in assembled interlocking relation thereto as seen in FIGS. 2 and 3. Head 34 of adapter 32 is connected to the main body of the adapter by the offset neck portion 35 which passes through and rides within an arcuate portion or semi-circular port 36 of the base extension 30. Free sliding engagement between the offset neck 35 of the adapter within aperture 31 along the arcuate portion 36 allows the shoulder strap 16 to be oriented diagonally across the user's chest while being releasably interlocked into the adapter base mounted to the lap belt section 11 passing horizontally across the user relative to the shoulder strap 16.

According to the present invention, the adapter body is immovably mounted or secured to the belt section 11 by passing a strap loop thereof into the adapter body and locking it therein immovably and securely as hereinafter explained. As seen in FIG. 4, the adapter base 20 is provided with a strap loop receiving aperture 40 extending transversely thereof between the upstanding side walls 22 and 23. Aperature 40 includes a pair of opposed side faces 41 and 42 extending generally traversely of the base between said side walls. It has been found that when aperture 40 is formed in base 20 by conventional stamping operations, the upper and lower edges of the aperture opposed side faces 41 and 42 present sufficiently sharp edges so as to cause undue strap wear or fraying and even possible failure thereof when the adapter device is placed in use. As can be seen in FIG. 2, the shoulder strap 16 applies a turning torque on the adapter base 20, when under load, tending to turn or twist the adapter relative to the lap belt strap 11. This turning movement of the adapter tends to cut or fray the strap 11 along the edges of the faces 41 and 42. In order to properly protect the strap 11 from wear and cutting due to this turning movement, web-like members 50 and 51 are slidably mounted to the base 21 within the aperture 40 and overlying the aperture side faces 41 and 42, and the upper and lower edges thereof, as best seen in FIG. 3. These slidably mounted web members 50 and 51 are preferably provided with a single radius curved surface 52 and 53 extending from the top walls 54 and 55 to the bottom walls 56 and 57, respectively. Such one radius curved surfaces 52 and 53 protect the strap 11 from cutting by the base and also provide opposed longitudinally extending snubber surfaces for immovably locking a loop portion 45 of strap 11 received therebetween.

To assemble the adapter body 20 to strap 11, a loop portion 45 of strap 11 is inserted into the adapter body through the aperture 40, the strap loop passing between the opposed web members 50 and 51. As particularly contemplated within the present invention, the loop 45 is immovably locked within the adapter by the provision of a load bar or locking bar 60 loosely disposed within loop 45 between the base side walls 22 and 23. As best seen in FIG. 4, the load bar 60 of the exemplary embodiment includes an elongate body 61 having a generally rectangular cross-section, as best seen in FIG. 3. The load bar body is preferably disposed within the adapter with the major axis of the body cross-section parallel to and spaced above the adapter base 21. As best seen in FIG. 2, the load bar elongate body 60 is also freely spaced from the adapter side walls 22 and 23, so that the load bar operates independently of the adapter base and side walls.

In the preferred exemplary embodiment of FIGS. 1 through 4, the elongate load bar 60 is provided with a generally perpendicularly depending flange 62 extending downwardly of the body 61. After the exemplary load bar 60 is loosely disposed within the loop 45, during assembly of the adapter to the section 11, it may be drawn downward toward the adapter base 21 by pulling the strap section 11 outwardly of the adapter base. As particularly contemplated within the present invention, the load bar 60 is not slidably or pivotally connected, or connected in any manner, to the adapter base or side walls and is free to be drawn down toward the adapter loop receiving aperture 40 during said withdrawal movement of the strap 11. As readily seen in FIG. 3, the load bar 60, when in operative locking position, seats itself down on portions 46 and 47 of strap loop 45 which curve under the lower longitudinally extending corners or edges 63 and 64 of the body 61. Depending load bar flange 62 extends down between strap portions 48 and 49 which bend around the opposed web members 50 and 51 oriented within aperture 40 overlying the aperture side faces 41 and 42 as hereinabove described. Depending flange 62 thereby tends to orient and position load bar 60 relative to the strap loop 45 and base aperture 40 as well as to snub or lockingly engage and pinch strap portions 48 and 49 against the web members 50 and 51 cooperating with the additional locking action of the load bar body acting on the upper portions of loop 45.

After the above described assembly of the adapter body to the lap belt section 11, the cover plate 26 may be merely snapped on to the upstanding side walls 22 and 23, as hereinabove explained, and the adapter device, of the present invention, is ready to releasably and lockingly receive and retain the shoulder strap fitting 32, also as hereinabove explained. It has been found that the adapter device of the aforedescribed preferred exemplary embodiment is very securely and immovably mounted to the lap belt strap 11 due to its construction as hereinabove explained to convert or adapt a conventional lap belt safety device into a preferred shoulder harness and lap belt safety restraint apparatus as seen in FIG. 1. At the option of the user, the shoulder strap 16 can be easily and readily connected or disconnected from the adapter which is immovably mounted on the lap belt strap section 11. Even when the lap belt section is retracted and not under load, the adapter device does not become released nor move along the strap 11, losing its preferred off center orientation on strap 11 relative to the user. As seen in FIG. 3, the cover plate 26 closely overlies the load bar 60 and encircling strap loop 45 thereby limiting any upward releasing movement of the load bar relative to the adapter base 21. Should it be desired to completely remove the shoulder harness or belt 16 to return the installation to a simple conventional lap safety belt device, the cover 26 may be merely sprung off of the base side walls 22 and 23, the strap loop 45 raised relative to the adapter base 21 and the load bar 60 merely dropped out from within the strap loop. The strap is then freely removed from the adapter and is returned to its original condition before the adapter for the shoulder harness was added thereto.

While it is preferred that two slide webs 50 and 51 be used on the adapter base, it has been found that the major twisting forces tending to cut and wear the belt strap section 11 occur along the adapter base edge 41 furthest from the plate-like extension 30 to which the shoulder strap fitting 32 is connected. It is therefore preferred that at least side wall 41 be covered by a slide web means, as the web 50 in the exemplary embodiment.

An alternative exemplary embodiment of the adapter device, according to the present invention, for use in a combination shoulder harness and lap belt safety restraint apparatus is shown in FIGS. 5 through 7. In this alternative exemplary embodiment, the adapter body 120 includes a base 121 with integrally formed upstanding spaced side walls 122 and 123. A plate-like extension 130 of the adapter base 121 is provided with an aperture 131 for receiving connecting means for releasably locking an end fitting 132 of a shoulder strap 116 to the adapter base. Such connecting means in the exemplary embodiment includes a flat headed pin 133 having a threaded bolt portion 134, an enlarged journal portion 135 and a flat head 136 underlying the plate extension 130 of the adapter base. End fitting 132 is provided with a circular aperture 137 adapted to slide over and loosely rotate about the pin journal portion 135. A washer 138 may be provided on a ledge formed by the journal portion 135 where the pin is reduced to the threaded bolt portion 134. Washer 138 is spaced above the end fitting 132 to assure free rotation of the end fitting about the journal portion 135 of the pin so that the shoulder strap 116 may assume its diagonal orientation relative to the lap belt strap 111 and the adapter body 120. An internally threaded cap or fastener means 139 is adapted to be screwed down on the threaded bolt portion 134 to retain a cover plate 126 assembled to the adapter body 120 and to prevent inadvertent removal of pin 133 causing release of the shoulder strap fitting 132. As seen in FIG. 6, the fastener means or cap 139 is provided with an internally threaded body 140 which may be screwed down by the integral hex head 141 until the lower end thereof abuts washer 138. Cover plate 126 has a rear depending wall 127 and an inturned lower flange 128 which underlies the raised or offset portion 129 of the adapter base 121.

A strap loop receiving aperture 140 is provided in the base 121 of the alternative exemplary embodiment to receive a loop portion 145 of the lap belt section 111. In this alternative exemplary embodiment, the forward and rearward longitudinally extending aperture faces are provided by a pair of opposed upwardly bent base flanges 141 and 142, respectively. Flanges 141 and 142 are preferably formed to provide opposed inwardly facing smooth arcuate surfaces 143 and 144, respectively, over which the strap loop portions 148 and 149 ride when the adapter is assembled to the strap section 111, as seen in FIG. 6.

As in the foregoing preferred exemplary embodiment, the strap loop 145 may be freely inserted into the adapter body through the aperture 140 and a load bar or locking bar 160 inserted therein loosely between the base side walls 122 and 123 to snub the strap loop 145 between opposed base aperture side faces on tightening or outward withdrawal of the strap section 111 relative to the base aperture. As best seen in FIG. 7, the load bar 160 in the alternative exemplary embodiment is formed from sheet metal, as is the base and cover aforedescribed, by conventional bending operations to provide downwardly convergent side walls depending from an integral interconnecting web 161. It is contemplated that the load bar 160 may be made of other materials, even a resilient rubber-like material to act as a snubber or locking bar within loop 145 between the aperture side faces. As best seen in FIG. 6, the load bar 160 of the alternative exemplary embodiment provides inclined downwardly convergent outwardly opposed side faces 163 and 164 which engage and abut against associated loop portions of the strap loop 145 to immovably and tightly wedge the strap loop between the aperture side faces formed by the upturned flanges 141 and 142. Cover plate 126 is closely spaced above the load bar 160 and encircling loop 145 to prevent inadvertent loosening of the load bar relative to the adapter base and consequent movement of the adapter on the strap section 111. The convergent walls 162' and 162 of the load bar, extend down between the base flanges 141 and 142 with portions of the strap loop therebetween to not only snub and tightly hold the strap loop to the adapter base but also to orient the load bar 160 within the adapter body and relative to the base aperture 140. The adapter device of the alternative exemplary embodiment may be thereby easily assembled and immovably mounted upon a pre-assembled and installed lap-type safety belt to releasably retain an added shoulder strap as in the foregoing preferred exemplary embodiment. Fastening means 139 can be removed to release pin 133 and release the shoulder strap 116 when desired. Such release is not as easily effected in this alternative exemplary embodiment as in the foregoing preferred embodiment of FIGS. 1 through 4 and is intended for installations where such release is expected to occur less frequently.

From the foregoing detailed explanation of two exemplary embodiments of the adapter device, according to the present invention, it can be seen that the various foregoing objects have been attained by the present invention. The adapter device of the present invention may be easily and readily assembled to a pre-existing, pre-assembled and even pre-installed lap-type safety belt and be securely and immovably mounted thereto after such assembly. The safety belt strap section is merely folded into a loop which is inserted into the adapter and the loop is thereafter securely retained therein by the provision of the loosely disposed load bar which is free of and not connected to the adapter base and side walls. On seating of the load bar within the associated strap loop down on loop portions adjacent the base aperture, the cover plate is snapped in place to limit upward movement of the load bar and encircling strap loop. As long as the load bar is loosely restrained in its operative position with a portion thereof depending between strap portions passing through the base aperture, the adapter device may not be inadvertently or intentionally moved along the associated safety belt strap section. Any such attempted movement of the adapter device tends to rotate the load bar within the adapter device with consequent snubbing or pinching of strap sections between the depending portion of the load bar and the adjacent edge faces of the base aperture. Undue wearing and failure of the safety belt strap section is prevented by the provision of the slide web members and the associated shoulder strap may be oriented diagonally across the user's chest and shoulder to be easily releasably interengaged with the connecting means of the adapter device.

The foregoing descriptions of exemplary embodiments of the adapter device of the present invention are intended to be exemplary only and it should be understood that other modifications, alterations and ramifications of the construction and method of assembling the adapter device may be made within the scope of the present invention, which is defined by and limited only by the following claims.

We claim:

1. An adapter device for use in a combination shoulder harness and lap belt safety restraint apparatus to releasably connect a shoulder strap to a lap belt strap section, said adapter device comprising:
   a body having a base and a pair of spaced upstanding side walls;
   connector means associated with said base for receiving and releasably retaining an end fitting of an associated shoulder strap of the restraint apparatus to said base;
   a strap loop receiving aperture in said base for receiving a strap loop of the associated lap belt strap, said base aperture having a pair of opposed side faces extending transversely of said base between said side walls; and
   load bar means loosely disposed between and free of said base side walls within said strap loop received through said base aperture for immovably mounting said body to said associated lap belt strap section.

2. The adapter device of claim 1 wherein:
said load bar means includes bar portions disposed between said base aperture opposed side faces for positioning said load bar within said strap loop and adapter and for snubbing portions of said strap loop against upper marginal portions of said aperture side faces.

3. The adapter device of claim 1 wherein:
said load bar means includes an elongate body having a generally rectangular cross-section and a generally perpendicularly depending flange extending down between said opposed aperture side faces.

4. The adapter device of claim 1 wherein:
said connector means associated with said base includes a plate-like extension of said base extending longitudinally outwardly of said base side walls and having means thereon for connecting to said shoulder strap end fitting.

5. The adapter device of claim 1 including:
cover means associated with said base side walls for enclosing said strap loop and load bar means within said base and for limiting vertical movement of said load bar means and associated strap loop relative to said base aperture.

6. The adapter device of claim 1 including:
slide web means including spaced sides and an interconnecting rounded web extending between said sides to be mounted to said base over a side face of said aperture and for providing smooth rounded surfaces overlying the associated edges of said aperture face to reduce wear on said strap at said aperture face edges when said adapter base is subjected to loading by said shoulder strap.

7. The adapter device of claim 6 wherein:
said slide web means is slidably mounted over at least the base aperture face furthest from said connector means associated with said base.

8. An adapter to be immovably mounted to a pre-assembled lap belt safety restraint apparatus to accommodate the addition of a shoulder strap to said restraint apparatus, said adapter comprising:
   a body having a base and an aperture therein to receive a loop of a safety belt strap pre-assembled to a safety belt buckle;
   connector means associated with said base for receiving and retaining an end fitting of a shoulder strap to be added to the restraint apparatus; and
   means for immovably restraining said loop to said base for immovably mounting said body to said safety belt strap.

9. The adapter of claim 8 wherein:
said means for immovably restraining said loop to said base includes a load bar loosely disposed between and free of said base side walls within said strap loop, said bar being pulled down toward said base aperture to tightly wedge portions of said loop between said bar and edges of said base aperture on tightening of said belt strap when said restraint apparatus is placed in an operative relation about a person to be restrained by said apparatus.

10. The adapter of claim 9 wherein:
said load bar includes a depending flange extending down centrally of said aperture between portions of said strap loop passing through said aperture.

11. The adapter of claim 8 including:
web means associated with an edge of said base aperture over which the strap passes for covering said edge and for providing a smooth curved surface on which said strap lies to prevent undue wearing of said strap at said aperture edge when under load because of irregularities in the base edge at said aperture.

12. The adapter of claim 11 wherein:
said web means is provided at the base aperture edge about which said base tends to rotate upon loading of said connector means by said shoulder strap.

13. The adapter of claim 8 wherein:
said connector means includes a plate-like extension of said base having a slot and a generally semi-circular port therein, said port merging at its widest section into said slot; and said end fitting of said shoulder strap includes a plate-like body having a locking head offset therefrom by an interconnecting neck portion, said head being insertable through said slot of the base extension to place said neck portion in sliding, limited rotatable engagement within said ports with said head underlying said base extension and said end fitting body overlying said base extension.

14. The adapter of claim 8 wherein:

said base includes a pair of upstanding side walls along outer side edges of said base and a pair of opposed upwardly and oppositely inclined walls extending transversely of said base along said base aperture, said walls being spaced by the width of said aperture; and said means for immovably restraining said loop to said base includes a load bar loosely disposed between and free of the base side walls within said loop, said bar having downwardly convergent side walls to seat between said base inclined walls to lock said loop therebetween.

References Cited

UNITED STATES PATENTS

| | | | |
|---|---|---|---|
| 2,743,497 | 5/1956 | Davis | 24—196 |
| 3,243,233 | 3/1966 | Davis | 297—389 |
| 3,317,970 | 5/1967 | Van Noord | 24—196 X |

FOREIGN PATENTS

| | | |
|---|---|---|
| 721,138 | 11/1965 | Canada. |
| 1,344,478 | 10/1962 | Italy. |

JAMES T. McCALL, *Primary Examiner.*